United States Patent [19]

Ichiki

[11] Patent Number: 5,725,700
[45] Date of Patent: Mar. 10, 1998

[54] HEAVY DUTY PNEUMATIC TIRES

[75] Inventor: Yasufumi Ichiki, Tokyo, Japan

[73] Assignee: Bridgestone Corporation, Tokyo, Japan

[21] Appl. No.: 535,749

[22] Filed: Sep. 28, 1995

[30] Foreign Application Priority Data

Sep. 28, 1994 [JP] Japan .................... 6-233547
Sep. 8, 1995 [JP] Japan .................... 7-231385

[51] Int. Cl.$^6$ .................................. B60C 115/00
[52] U.S. Cl. .................. 152/209 R; 152/209 D
[58] Field of Search ............ 152/209 R, 209 D

[56] References Cited

U.S. PATENT DOCUMENTS

| D. 336,455 | 6/1993 | Hammond et al. | D12/149 |
| 4,057,089 | 11/1977 | Johannsen | 152/209 R |
| 4,832,099 | 5/1989 | Matsumoto | 152/209 R |
| 4,865,101 | 9/1989 | Williams | 152/209 R |
| 5,421,391 | 6/1995 | Himuro | 152/209 R |
| 5,423,364 | 6/1995 | Himuro | 152/209 R |
| 5,435,366 | 7/1995 | Voigt et al. | 152/209 R |

FOREIGN PATENT DOCUMENTS

| 0 625 435 A1 | 11/1994 | European Pat. Off. |  |
| 2 666 053 | 2/1992 | France . |  |
| 127218 | 5/1994 | Japan | 152/209 R |
| 305307 | 11/1994 | Japan | 152/209 D |
| 2 192 842 | 1/1988 | United Kingdom . |  |
| 2224472 | 5/1990 | United Kingdom | 152/209 D |
| 2 240 522 | 8/1991 | United Kingdom . |  |

OTHER PUBLICATIONS

Patent Abstracts of Japan, JP 6055909, Jan. 3, 1994, "Tire for Motor-Bicycle".

*Primary Examiner*—Steven D. Maki
*Attorney, Agent, or Firm*—Sughrue, Mion, Zinn, Macpeak & Seas, PLLC

[57] ABSTRACT

A heavy duty pneumatic tire possessing excellent wet-running performances and wear resistance comprises a tread portion provided at its surface with a plurality of main grooves arranged on both sides with respect to an equatorial plane at a given interval in a circumferential direction of the tire and has a negative ratio of not more than 0.3. In this tire, the main grooves curvedly extend in a converging direction from each side end of the tread toward the equatorial plane and terminate on the equatorial plane or in the vicinity thereof within 25% of a tread width (W) centering around the equatorial plane so as to meet the terminals of opposed main grooves with each other or somewhat separate away them from each other and have particular inclination angle ($\alpha$), and continuously projection lengths ($L_1$, $L_2$) in the widthwise and circumferential directions.

6 Claims, 3 Drawing Sheets

FIG_1
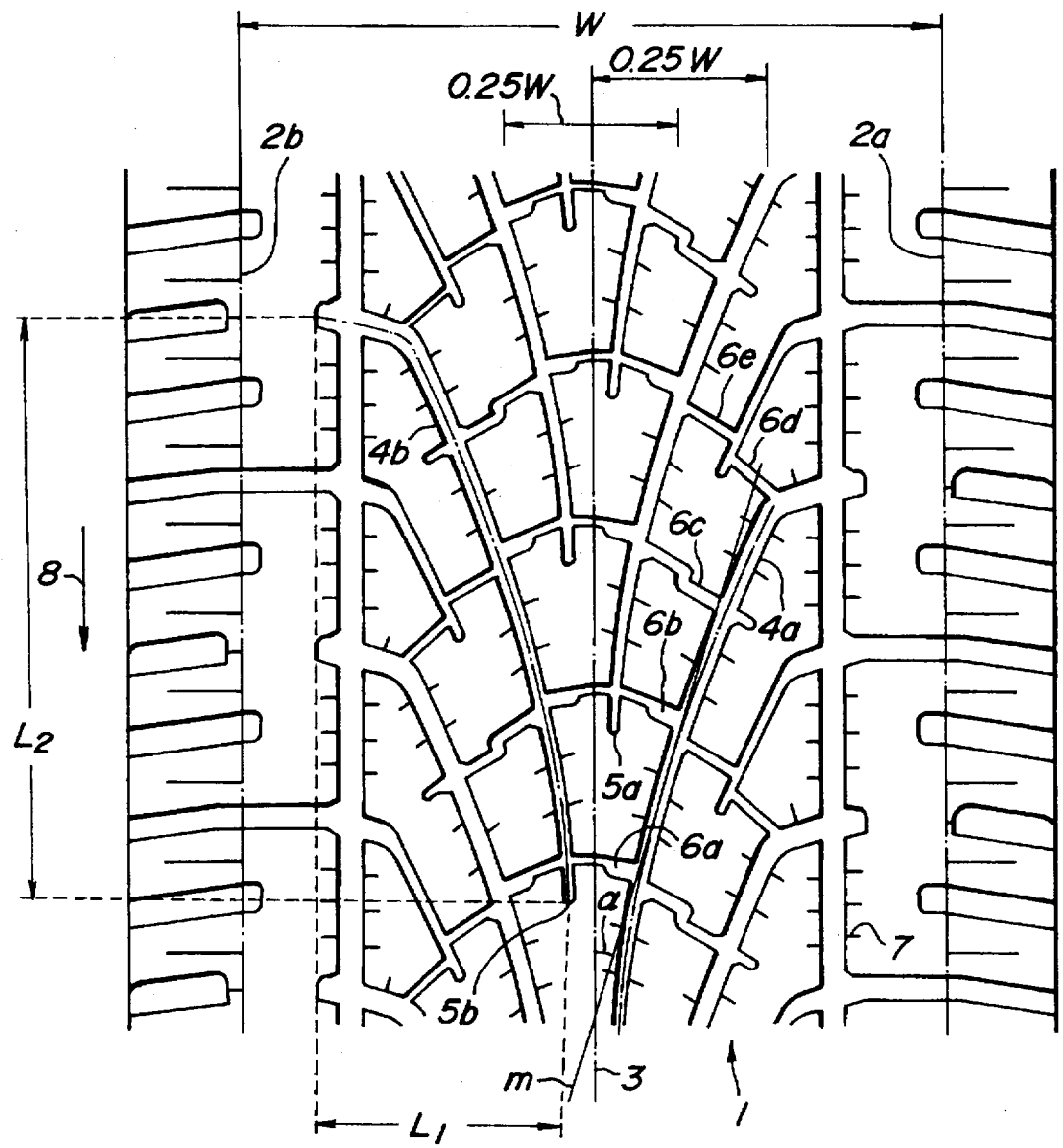

FIG_2
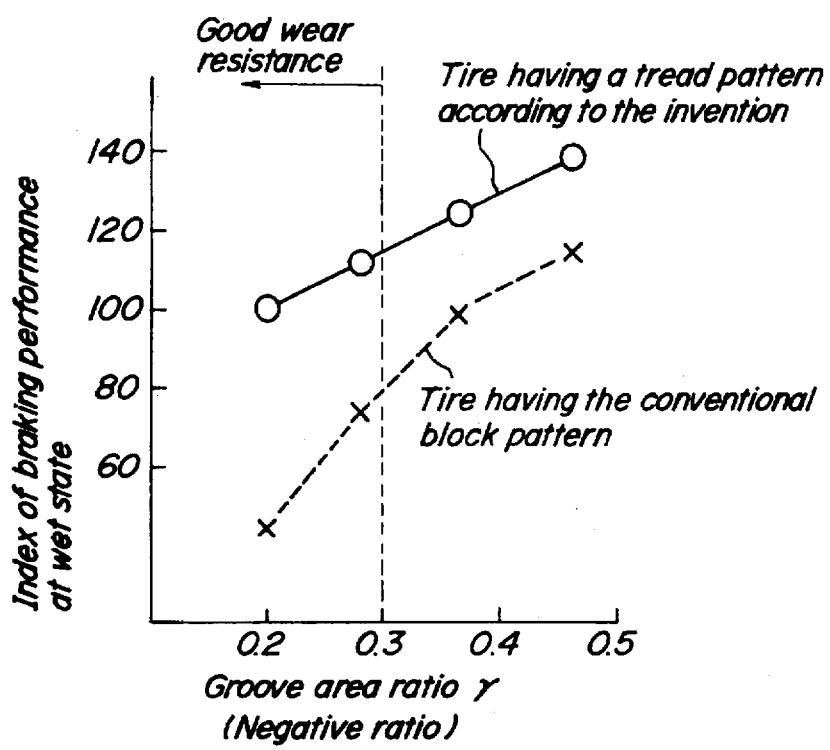
FIG_3
PRIOR ART
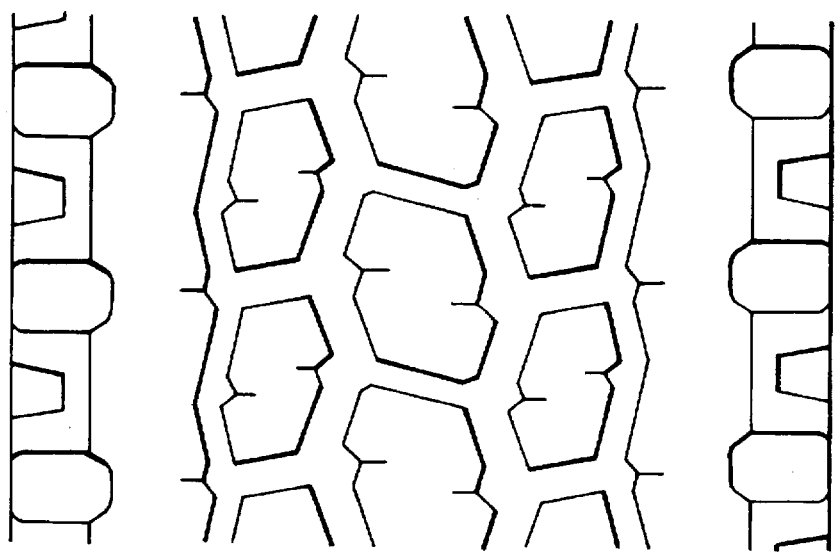

FIG_4
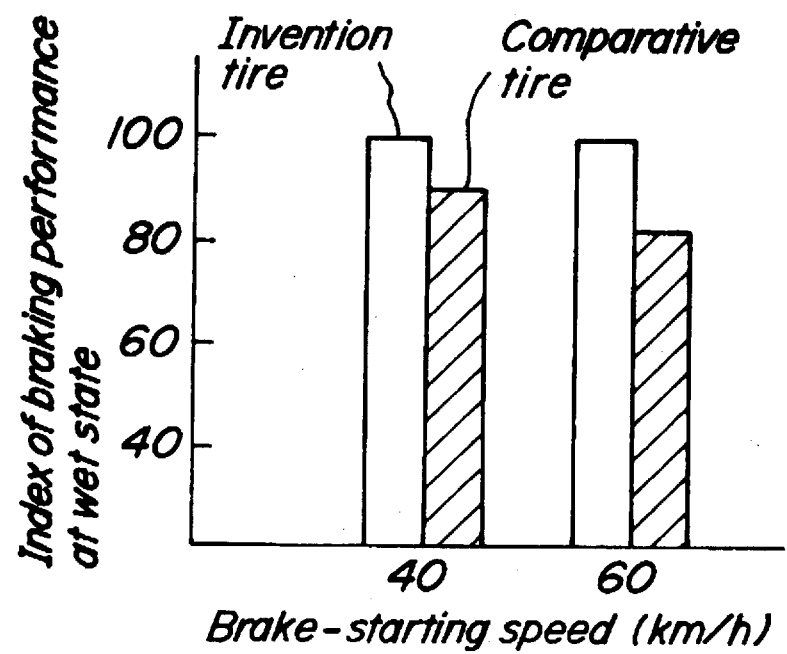

HEAVY DUTY PNEUMATIC TIRES

BACKGROUND OF THE INVENTION

1. Field of the Invention

This invention relates to heavy duty pneumatic tires, and more particularly to a heavy duty pneumatic radial tire having satisfactory wear resistance at a relatively small negative ratio and good wet-running performance by enhancing an arrangement efficiency of tread grooves.

2. Description of the Related Art

In general, main grooves extending circumferentially of the tire and various grooves such as auxiliary grooves extending in the widthwise direction of the tire and the like are arranged in a tread portion of the tire, if necessary, in order to sufficiently develop wet-running performance such as traction and braking properties on wet road surface and so on.

In order to improve wet-running performance, it is effective to increase a ratio of groove area occupied in a ground contact area of the tread portion or the so-called negative ratio. Inversely, it is favorable to reduce the ratio of groove area occupied in a ground contact region of the tread portion in order to improve wear resistance. That is, the wet-running performance and the wear resistance are conflicting with each other, so that it is difficult to simultaneously establish both the properties.

SUMMARY OF THE INVENTION

It is, therefore, an object of the invention to provide a heavy duty pneumatic tire possessing sufficient wear resistance by setting the negative ratio to a relatively small value of not more than 0.3 and having good wet-running performance by rationalizing the arrangement and shape of the main grooves.

According to the invention, there is the provision of a heavy duty pneumatic tire comprising a tread portion provided at its surface with a plurality of main grooves arranged on both sides with respect to an equatorial plane at a given interval in a circumferential direction of the tire in which the main grooves curvedly extend in a converging direction from each side end of the tread toward the equatorial plane and terminate on the equatorial plane or in the vicinity thereof so as to meet the terminals of opposed main grooves with each other or somewhat separate away them from each other and form a directional pattern by gradually entering into a ground contact region of the tread portion from the terminal toward the side end of the tread portion, the improvement wherein the tread pattern has a negative ratio is not more than 0.3, and the terminals of the opposed main grooves are located within 25% of a tread width (W) centering around the equatorial plane, and a part of the main groove located in a zone ranging from the equatorial plane to at least 25% of the tread width (W) satisfies that an inclination angle ($\alpha$) of a tangential line (m) drawn to this part with respect to the equatorial plane gradually increases in accordance with the separation from the equatorial plane, and a continuously projection length ($L_1$) of the main groove in the widthwise direction is not less than 30% of the tread width (W) and a continuously projection length ($L_2$) of the main groove in the circumferential direction is not less than 70% of the tread width (W).

The term "tangential line (m) drawn to the part of the main groove" used herein means a tangential line drawn to a phantom line passing through a widthwise center of the main groove. The term "continuously projection lengths ($L_1$ and $L_2$) of the main groove in the widthwise direction and the circumferential directions" used herein mean lengths produced when the phantom line passing through the widthwise center of the main groove are projected in the widthwise direction and the circumferential direction, respectively.

BRIEF DESCRIPTION OF THE DRAWINGS

The invention will be described with reference to the accompanying drawings, wherein:

FIG. 1 is a partially developed view of a tread portion in the heavy duty pneumatic tire according to the invention;

FIG. 2 is a graph showing braking performance at wet state plotted when the negative ratio is changed;

FIG. 3 is a diagrammatic view showing a block pattern of the conventional tire; and FIG. 4 is a graph showing an index of braking performance when the tire is braked at speed of 40 km/h and 60 km/h on wet road surface.

DESCRIPTION OF THE PREFERRED EMBODIMENTS

In FIG. 1 is a tread portion in a typical heavy duty pneumatic tire according to the invention, in which numeral 1 is a tread portion, numerals 2a and 2b side ends of the tread portion, numeral 3 an equatorial plane of the tire, numerals 4a and 4b main grooves, and numerals 5a and 5b terminals of the main grooves, respectively.

In the tire having a tread pattern shown in FIG. 1, a plurality of main grooves 4a and 4b are arranged in the tread portion 1 on both sides with respect to the equatorial plane 3 at a given interval in a circumferential direction of the tire in which these main grooves curvedly extend in a converging direction from each side end 2a, 2b of the tread toward the equatorial plane 3 and terminate in the vicinity of the equatorial plane 3. The terminals 5a, 5b of opposed main grooves 4a, 4b are shifted from each other by a half pitch in the circumferential direction and separate away from each other at an equal distance from the equatorial plane 3. This forms a directional pattern by gradually entering into a ground contact region of the tread portion from the terminal 5a or 5b toward the side end 2a or 2b.

In addition to the illustrated embodiment, the terminals 5a and 5b of the opposed main grooves 4a and 4b may take various positional relations. For example, these terminals 5a, 5b may be arranged in symmetry with each other with respect to the equatorial plane 3 without shifting them in the circumferential direction or join with each other on the equatorial plane or in the vicinity thereof (i.e. the main grooves 4a, 4b may communicate with each other). Alternatively, the main grooves 4a, 4b may be terminated in the vicinity of the equatorial plane 3 to separate away the terminals 5a, 5b from each other in the widthwise direction and/or the circumferential direction.

In the tire according to the invention, the negative ratio of the tread pattern is restricted to not more than 0.3, whereby good wear resistance can be ensured. According to the invention, the reason why the good drainage property is obtained even when the negative ratio is not more than 0.3 is based on the following fact.

In general, when the tire is run on wet road surface under loading, water existing on road surface ahead the tire invades between the ground contact region of the tire and the ground to reduce a ground contact area of the tire tread directly contacting with ground (hereinafter referred to as actual ground contact area), whereby slipping of the tire on wet road surface is caused to degrade the wet-running performances.

In tires having a conventional tread pattern such as a rib pattern, block pattern or the like, water invaded into the ground contact region is discharged through the grooves. In such a tire, however, the main groove is arranged in the circumferential direction of the tire therealong, so that water invaded into the ground contact region is pushed ahead the tire along the arranging direction of the main groove and hence the pushed water is again treaded by the tire to decrease the actual ground contact area, whereby the wet-running performances are degraded and particularly the braking performance in the running at higher speed is considerably degraded.

In the heavy duty pneumatic tire according to the invention, however, the main groove is formed to gradually enter into the ground contact region of the tire from the terminal toward the tread end. The terminals 5a, 5b of the main grooves 4a, 4b are located within 25% of the tread width W centering around the equatorial plane of the tire and the inclination angle α of the tangential line m drawn to a part of the main groove in a zone ranging from the equatorial plane to at least 25% of the tread width W is gradually increased in accordance with the separation from the equatorial plane, preferably within a range of 5°–25°. Hence, water invaded into the ground contact region is pushed sideward from the tire along the arranging direction of the main groove and thus the pushed water is not again treaded by the tire, whereby the decrease of the actual ground contact area can be prevented to improve the wet-running performances.

Furthermore, the continuous projection length $L_1$ of the main groove in the widthwise direction is made to not less than 30% of the tread width W and the continuous projection length $L_2$ of the main groove in the circumferential direction is made to not less than 70% of the tread width W, whereby water invaded into the ground contact region is efficiently discharged. When the continuous projection length $L_1$ is less than 30% and the continuous projection length $L_2$ is less than 70%, the drainage property is insufficient.

Moreover, the negative ratio is preferably within a range of 0.25–0.29 from a viewpoint that the wear resistance and the wet-running performance are most balanced.

In FIG. 1, the tread portion 1 is provided with auxiliary grooves 6a–6e opening to the two main grooves and two to three blind sipes 7 formed in an end portion of a block portion facing to the main groove. These auxiliary grooves and sipes may be arranged, if necessary, because the arrangement of the auxiliary grooves 6a–6e is to improve the traction and braking performance at a wet state and the arrangement of the blind sipes 7 is to make the ground contact pressure of the block portion uniform.

Since the arrangement and shape of the main groove in the tire according to the invention are rationalized as mentioned above, if the wet-running performance is equal to those of the conventional tire, the negative ratio can be made to not more than 0.3 as compared with that of the conventional tire, so that the satisfactory wear resistance can be obtained. When the negative ratio is not more than 0.3, as seen from FIG. 2, the wet-running performance of the tire having the conventional block pattern considerably lower, while the degree of lowering the wet-running performances is small in the tire having the tread pattern according to the invention, so that the invention is recognized to be superior to the conventional tire.

The following examples are given in illustration of the invention and are not intended as limitations thereof.

Invention tire

A heavy duty pneumatic tire used in this example has a tread pattern shown in FIG. 1 and a tire size of 11R22.5, in which a plurality of main grooves 4a and 4b are arranged in a tread portion 1 on both sides with respect to an equatorial plane 3 at a given interval in a circumferential direction of the tire to curvedly extend in a converging direction from each side end 2a, 2b of the tread toward the equatorial plane 3 and terminate in the vicinity of the equatorial plane 3 to shift the terminals 5a, 5b of opposed main grooves 4a, 4b from each other by a half pitch (50 mm) in the circumferential direction and separate away them from each other at an equal distance (8 mm) from the equatorial plane 3 and form a directional pattern by gradually entering into a ground contact region of the tread portion from the terminal 5a or 5b toward the side end 2a or 2b. In this case, the negative ratio is 0.27.

When a portion of the main groove 4a, 4b is located in a zone ranging from the equatorial plane 3 to 25% of the tread width W, an inclination angle α of a tangential line m drawn to this part with respect to the equatorial plane 3 is gradually increased in accordance with the separation from the equatorial plane 3 so as to be 5° at the positions of the terminals 5a, 5b and 25° at the position corresponding to 25% of the tread width.

Further, the continuously projection length $L_1$ of the main groove 4a, 4b in the widthwise direction is 48% of the tread width W, and the continuous projection length $L_2$ of the main groove 4a, 4b in the circumferential direction is 105% of the tread width W.

The main groove has a groove depth of 16.5 mm and a groove width of 2.5 mm at a position of the terminal 5a or 5b and 7 mm at a position of the tread end 2a or 2b.

Furthermore, the tread portion 1 is provided with auxiliary grooves 6a–6e opening to the two main grooves and two to three blind sipes 7 formed in an end portion of a block portion facing to the main groove.

Moreover, a carcass is comprised of a single rubberized radial cord ply containing steel cords therein, and a belt is comprised of four rubberized cord layers in which a cord angle with respect to the circumferential direction of the tire is 50° upward to the right in a first layer, 18° upward to the right in a second layer, 18° upward to the left in a third layer and 18° upward to the left in a fourth layer and cords of the second and third layers are crossed with each other. The other tire structures are substantially the same as in the conventional tire.

Comparative tire

A tire used in this comparative example is substantially the same as in the above example except that a portion of the main groove 4a, 4b located in a zone ranging from the equatorial plane 3 to 25% of the tread width W is straight-way extended from the equatorial plane 3 at such a certain inclination angle that the inclination angle α of the tangential line m drawn to this part with respect to the equatorial plane 3 is 15° at the positions of the terminals 5a, 5b and 15° at the position corresponding to 25% of the tread width.

Conventional tire

A tire used in this conventional example is a tire having the conventional block pattern as shown in FIG. 3, in which the negative ratio is 0.32%.

Test Method and Results

The wet-running performance and wear resistance are evaluated with respect to the above tires as follows.

Each of the tires to be tested is run on wet road surface and braked at a speed of 40 km/h or 60 km/h, during which a running distance till the stop of a vehicle is measured. The wet-running performance is evaluated by a reciprocal of the running distance as an index of braking performance at wet state on the basis that the comparative tire is 100, in which the larger the index value, the better the wet-running performance. The measured results are shown in FIG. 4. As seen from FIG. 4, the invention tire is excellent in the wet-running performance at either brake-starting speeds as compared with the comparative tire.

Then, each of the tires to be tested is actually run on road over a distance of 80,000 km and thereafter an amount of the tread rubber worn away is measured, from which a running distance (km) per 1 mm of worn amount is calculated. The wear resistance is evaluated by an index of such a running distance on the basis that the conventional tire is 100, in which the larger the index value, the better the wear resistance. As a result, the index value of the comparative tire is 120 and that of the invention tire is 133, from which it is apparent that the invention tire is most excellent in the wear resistance.

As mentioned above, according to the invention, water invaded into the ground contact region is pushed sideward from the tire along the arranging direction of the main groove and hence the pushed water is not again treaded by the tire different from the conventional tire, whereby the decrease of the actual ground contact area can be prevented to improve wet-running performance. Furthermore, even when the negative ratio is made sufficiently small as compared with the conventional tire, sufficient wet-running performance is obtained together with the excellent wear resistance.

Thus, the invention can provide heavy duty pneumatic tires simultaneously satisfying the wet-running performance and wear resistance, which have never been attained in the tires having the conventional tread pattern.

What is claimed is:

1. A heavy duty pneumatic tire comprising; a tread portion provided at its surface with a plurality of main grooves arranged on both sides with respect to an equatorial plane at a given interval in a circumferential direction of the tire, said main grooves curvedly extending in a converging direction from each side end of the tread toward the equatorial plane and terminate on the equatorial plane or in the vicinity thereof to form a directional pattern, auxiliary grooves connecting adjacent main grooves on each side of said equatorial plane thereby forming a block pattern along said equatorial plane in which a terminal of a main groove lies within a block, a circumferential groove arranged on each side of said equatorial plane in side regions of said tread portion, lateral grooves crossings a circumferential groove to define in each side portion a row of blocks positioned between said circumferential groove and a side end of the tread portion, each main groove terminating at one of said block so as not to communicate with the side end of said tread portion, wherein, said tread portion has a negative ratio and the negative ratio is not more than 0.3, and terminals of the main grooves are located within 25% of a tread width (W) centered around the equatorial plane, and a portion of the main groove located in a zone ranging from the equatorial plane to at least 25% of the tread width (W) is inclined such that an inclination angle ($\alpha$) of a tangential line (m) drawn to said portion with respect to the equatorial plane gradually increases in accordance with the separation from the equatorial plane, and a continuously projection length ($L_1$) of the main groove in the axial direction is not less than 30% of the tread width (W) and a continuously projection length ($L_2$) Of the main groove in the circumferential direction is not less than 70% of the tread width (W).

2. The heavy duty pneumatic tire according to claim 1, wherein the negative ratio is within a range of 0.25–0.29.

3. The heavy duty pneumatic tire according to claim 1, wherein the inclination angle $\alpha$ is within a range of 5°–25°.

4. The heavy duty pneumatic tire according to claim 1 wherein said main grooves terminate in the vicinity of said equatorial plane and end points thereof are circumferentially staggered on opposite sides of said equatorial plane.

5. The heavy duty pneumatic tire according to claim 4 wherein said end points are shifted by a half pitch in said circumferential direction.

6. The heavy duty pneumatic tire according to claim 4 wherein said end points are at equal distances from said equatorial plane.

* * * * *